United States Patent Office.

JOSEPH A. TATRO, OF HARTFORD, CONNECTICUT.

*Letters Patent No.* 99,728, *dated February* 8, 1870; *reissue No.* 3,867, *dated March* 1, 1870.

IMPROVED PROCESS OF TREATING PETROLEUM.

The Schedule referred to in these Letters Patent and making part of the same

I, JOSEPH A. TATRO, of Hartford, in the county of Hartford, and State of Connecticut, have invented a Process of Converting the Whole Product arising from the Distillation of Crude Petroleum into a safe burning-oil, of which the following is a specification.

To show the nature and importance of my invention, as distinguished from the processes already in use, I will explain that when crude petroleum is distilled in the common way, the first product is gasoline, the second, benzole, the third, benzine, the fourth, a light oil, the fifth, the common burning-oil, then paraffine oil, and last, a dark, heavy oil. The only one of these parts fit for burning in the family lamp is the fifth product just specified.

By my process I am enabled to take all the above products, mix them together, and make of the whole a safe and reliable oil.

The difficulty to be overcome is to raise the fire-test, that is, the temperature at which flame will ignite the oil, to such a point as will make the oil safe for family use, and this I accomplish perfectly.

My process is as follows:

Having distilled the crude oil, and driven over every thing that will go over in the worm of the still, and having, say, one hundred gallons of distillate, take from one-fourth of one per centum of sulphuric acid, (I have heretofore used acid of 66° gravity) to two per centum, the quantity being regulated as hereinafter shown, mix it with the distillate, and agitate the whole most thoroughly.

I have heretofore used a mechanical agitator made expressly for this purpose, and have found from five to ten minutes agitation long enough to thoroughly mix the distillate and the acid.

Now add from four to six per centum of dry-slacked lime, sprinkling it over the distillate, and continue the agitation till the desired fire-test is reached. The quantity of lime is regulated, as hereinafter shown.

The fire-test can be raised to a perfectly safe degree, almost anywhere from 110° to 160° Fahrenheit, and the longer the agitation, the higher the fire-test. I have found from thirty to forty-five minutes long enough for this purpose.

Sulphuric acid may be used with phosphate of lime, in the place of the slacked lime, if desired, but in this case it is better to mix the substances before putting them with the distillate.

The amount of sulphuric acid and of lime used is determined by the gravity of the distillate, using the greater quantity for the lighter gravity. To commence with, the agitation must be perfect and thorough.

A fair average gravity for the distillate is 43° or 44°, measured by any standard hydrometer. No crude oil that will yield a distillate below 40° gravity is likely, in the present state of the art, to be used for the manufacture of burning-oil; neither is a crude oil likely to be used that will yield a distillate of above 48° gravity, so that from 40° to 48° may be taken practically as the range of gravities in the distillates required to be treated.

Premising once more that the agitation is perfectly done, about one-fourth of one per centum of sulphuric acid will do for a distillate of 40° gravity, and the percentage increases regularly as the gravity rises, till it will require about two per centum of acid for a distillate of 48° gravity.

As to lime, for a distillate of 40° gravity, about four per centum of lime will do, and the percentage increases with the rise in gravity, till about six per centum is needed for a distillate of 48° gravity.

If it is required to treat a distillate of a gravity below 40° or above 48° gravity, the proportions given for the gravities between 40° and 48° will furnish the basis for calculating the amounts of acid and lime to be used.

*Claim.*

I claim as my invention—

The process described of applying the said ingredients, in about the proportions specified, to the whole product arising from the distillation of crude petroleum oil, for the purpose set forth.

JOSEPH A. TATRO.

Witnesses:

WM. ED SIMONDS,

H. W. HUTCHINSON, Jr.